(12) United States Patent
Hubschneider et al.

(10) Patent No.: US 9,311,891 B2
(45) Date of Patent: Apr. 12, 2016

(54) METHOD AND DEVICE FOR REDUCING A MUTUAL INFLUENCE OF PIXELS OF A PIXEL GROUP

(71) Applicants: Andreas Hubschneider, Stuttgart (DE); Andreas Gehrig, Ettlingen (DE); Markus Lindner, Stuttgart (DE); Hermann Kroener, Remchingen (DE); Igor Katchan, Leonberg (DE)

(72) Inventors: Andreas Hubschneider, Stuttgart (DE); Andreas Gehrig, Ettlingen (DE); Markus Lindner, Stuttgart (DE); Hermann Kroener, Remchingen (DE); Igor Katchan, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 283 days.

(21) Appl. No.: 13/855,821

(22) Filed: Apr. 3, 2013

(65) Prior Publication Data

US 2013/0257695 A1 Oct. 3, 2013

(30) Foreign Application Priority Data

Apr. 3, 2012 (DE) .......................... 10 2012 205 427

(51) Int. Cl.
| | |
|---|---|
| *G09G 5/10* | (2006.01) |
| *G09G 5/02* | (2006.01) |
| *H04N 13/00* | (2006.01) |
| *G09G 3/00* | (2006.01) |

(52) U.S. Cl.
CPC .. *G09G 5/10* (2013.01); *G09G 5/02* (2013.01); *H04N 13/0018* (2013.01); *G09G 3/003* (2013.01); *G09G 2320/0209* (2013.01); *G09G 2360/144* (2013.01)

(58) Field of Classification Search
CPC .............. G09G 2320/0209; G09G 2320/0214; H04N 13/0018
See application file for complete search history.

(56) References Cited

U.S. PATENT DOCUMENTS

| | | | | |
|---|---|---|---|---|
| 8,305,401 | B1* | 11/2012 | Lie ................................ | 345/690 |
| 2003/0080967 | A1* | 5/2003 | Milch et al. ................... | 345/589 |
| 2006/0221030 | A1* | 10/2006 | Shih et al. ....................... | 345/88 |
| 2008/0231547 | A1* | 9/2008 | Yagiura et al. .................... | 345/4 |
| 2009/0040297 | A1* | 2/2009 | Harada et al. ..................... | 348/54 |
| 2010/0027072 | A1* | 2/2010 | Enjuji ........................... | 358/3.01 |
| 2012/0019493 | A1* | 1/2012 | Barnhoefer ........ | H05B 33/0851 345/207 |

FOREIGN PATENT DOCUMENTS

DE 10 2011 007 518 10/2012

* cited by examiner

*Primary Examiner* — Koosha Sharifi-Tafreshi
*Assistant Examiner* — Chun-Nan Lin
(74) *Attorney, Agent, or Firm* — Kenyon & Kenyon LLP

(57) ABSTRACT

A method for reducing a mutual influence of pixels of a pixel group having at least one first pixel allocated to a first image and having at least one second pixel adjacent thereto allocated to a second image, the first image being capable of being represented on a viewing direction-dependent display device so as to be recognizable from a first direction of view, and the second image being capable of being represented on the display device so as to be recognizable from a second direction of view differing from the first direction of view, the method having a step of adaptation, using a processing rule, of a first brightness factor of the at least one first pixel and of a second brightness factor of the at least one second pixel in order to reduce the mutual influence.

12 Claims, 3 Drawing Sheets

METHOD AND DEVICE FOR REDUCING A MUTUAL INFLUENCE OF PIXELS OF A PIXEL GROUP

CROSS REFERENCE

The present application claims the benefit under 35 U.S.C. §119 of German Patent Application No. DE 102012205427.8 filed on Apr. 3, 2012, which is expressly incorporated herein by reference in its entirety.

FIELD

The present invention relates to a method for reducing a mutual influence of pixels of a pixel group, to a corresponding device, and to a corresponding computer program product.

BACKGROUND INFORMATION

On a display device, different images may be recognizable from different angles of view. For this purpose, for example a mask can enable a view of a first pixel of the display device when the device is viewed from a first angle of view, while the mask blocks the view of an adjacent, second pixel from the first angle of view. If the device is viewed from a different angle of view, the mask can block the first pixel, while the second pixel is visible. If the first pixel is part of a first image, and the second pixel is part of a second image, then from the first angle of view the first image can be recognized while from the second angle of view the second image can be recognized.

German Patent Application No. DE 10 2011 007 518 describes a display device for motor vehicles.

SUMMARY

The present invention provides an example method for reducing a mutual influence of pixels of a pixel group, as well as an example device that uses this method, as well as, finally, an example corresponding computer program product, according to the main claims. Advantageous embodiments are explained below.

When a plurality of images is shown on a single display device, a contrast between immediately adjacent pixels may be very large. A bright pixel of a first image can then outshine, or block by crossview, an adjacent dark pixel of a second image. This effect is also referred to as crosstalk. At least in regions in which the first image is bright, and alternatively or in addition the second image is dark, the second image may have so-called echoes or ghost images that reproduce parts of the first image.

In accordance with the present invention, crosstalk can be reduced by reducing the contrast between the adjacent pixels. In particular through a reduction of the brightness of the brighter pixel, the effect can be attenuated or prevented. The human eye perceives a brightening of dark regions much more strongly than it does the reduction of brightness in bright regions.

Advantageously, through a reduction of the brightness via a multiplication factor for individual pixels or all pixels of an (entire) image, an information content of the respective image may be obtained without, in particular, artificially falsifying bright regions.

The present invention provides an example method for reducing a mutual influence of pixels of a pixel group having at least one first pixel allocated to a first image, and having at least one second pixel adjacent thereto allocated to a second image, the first image being capable of being displayed on a viewing direction-dependent display device so as to be recognizable from a first direction of view, and the second image being capable of being displayed on the display device so as to be recognizable from a second direction of view that differs from the first direction of view, the example method including the following step: adaptation, using a processing rule, of a first brightness factor of the at least one first pixel and of a second brightness factor of the at least one second pixel in order to reduce the mutual influence.

A mutual influence can be understood as a crosstalk of a brighter pixel on one or more dark pixel(s). A pixel can be shown on a display device through a plurality of subpixels, situated adjacent to one another, of a plurality of color channels. A color and brightness impression of the pixel can be produced through an additive mixture of intensities of the color channels. A pixel group can represent pixels of a plurality of images with a uniform or similar image coordinate. Pixels and subpixels of the pixel group can be interwoven or interleaved and/or mixed. In particular, subpixels of a color channel can be situated alongside one another. A viewing direction-dependent display device can be a display for at least two viewers who can perceive different images from one device. The display device can be a display screen having a device for the viewing direction-dependent coverage of a portion of the pixels of the display screen. The display device can be a DualView display. The display device can also be a display for a spatial representation of contents. A brightness factor can be a multiplication factor, for example between zero and one. The brightness factor can be fashioned so as to reduce, when applied to a value of a pixel, an initial brightness of this pixel by a percentage. A processing rule can be an algorithm. The processing rule can take into account factors that influence the display.

The first brightness factor and the second brightness factor can be adapted using an ambient brightness value. Because, the crosstalk does not produce bright artifacts compared to the intended image, when there is high ambient brightness the crosstalk is less visible than when ambient brightness is low. Therefore, the brightness factors can be adapted more strongly for example in conditions of darkness than in daylight.

The first brightness factor can be adapted using a first ambient brightness value, and alternatively or in addition the second brightness factor can be adapted using a second ambient brightness value. Different ambient brightness values can for example reflect a direction of incident light relative to the display device.

The first brightness factor can be adapted using a radiation characteristic of the display device that is a function of the direction of view, and alternatively or in addition the second brightness factor can be adapted using the radiation characteristic. The display device may be perceived with a lower brightness given a lateral direction of view of the display device that is becoming larger. Therefore, the representation of the flatter radiated image can be darkened less.

The first brightness factor can be adapted using a first correction parameter read in or inputted by a first viewer of the first image, and alternatively or in addition the second brightness factor can be adapted using a second correction parameter read in or inputted by a second viewer of the second image. A correction parameter can for example be read in by an operating element. The correction parameter can represent a desire of a viewer for a brighter or darker display. For example, a viewer may be sensitive to brightness contrasts and brightness stimuli (night blindness). In this case, the contrast of the image viewed by the viewer can be reduced in order to avoid disturbing the viewer.

The first brightness factor can be adapted using a first color correction value, and alternatively or in addition the second brightness factor can be adapted using a second color correction value. By reducing the overall brightness of a pixel, a color impression of the pixel can be modified. This modification can be corrected by a color correction via a color correction value.

The method can have a step of influencing a background brightness of the display device, using a further processing rule. An influencing of a background brightness may be understood as a change in a brightness of a background lighting. For example, a reduction in the background brightness can result in an overall maintenance of a color impression of the images without reducing the scope of contrast.

A brightness effect of the at least one first pixel and of the at least one second pixel can be adapted, below a boundary value, using the influence of the background brightness. The brightness effect above the boundary value can be adapted using the adaptation of the first brightness factor and of the second brightness factor. A brightness effect can be a combined brightness impression of the images. If for example both images have few lights (i.e., bright spots or light points), then an overall brightness can be reduced, because the lights are noticeable even at low brightness. If one of the images has many lights while the other image has few lights, then a high background brightness is necessary. The pixels of the other image can then be adapted via the brightness factor.

In addition, the present invention provides a device for reducing a mutual influence of pixels of a spatially correlated pixel group that is fashioned to carry out or implement the at least one step of the example method according to the present invention in at least one corresponding device. Through this variant embodiment of the present invention in the form of a device, the object of the present invention can also be achieved quickly and efficiently.

A device can be understood in the present context as an electrical apparatus that processes sensor and/or data signals and outputs control and/or data signals as a function thereof. The device can have an interface that can be realized as hardware and/or software. In the case of a realization as hardware, the interfaces can for example be part of a so-called system ASIC containing a wide range of functions of the device. However, it is also possible for the interfaces to be separate integrated circuits, or to be made up at least partly of discrete components. In the case of a realization as software, the interfaces can be software modules present for example on a microcontroller alongside other software modules.

Also advantageous is an example computer program product having program code that can be stored on a machine-readable bearer such as a semiconductor memory, a hard disk memory, or an optical memory, and that can be used to carry out the example method according to one of the specific embodiments described above when the program product is executed on a computer or on a device.

BRIEF DESCRIPTION OF THE DRAWINGS

Below, the present invention is explained in more detail on the basis of examples shown in the figures.

DETAILED DESCRIPTION OF EXAMPLE EMBODIMENTS

Figure 1A:
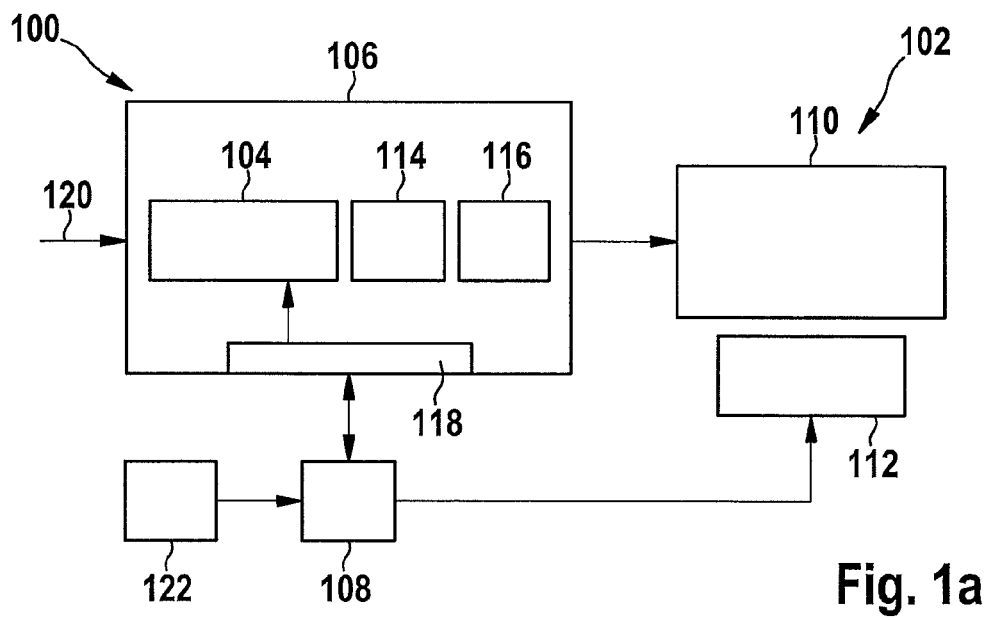
FIG. 1a shows a block diagram representation of a periphery of a display device for displaying two images, having a device for reducing a mutual influence of pixels of a pixel group of the display device, according to an exemplary embodiment of the present invention.

In the following description of preferred exemplary embodiments of the present invention, identical or similar reference characters are used for elements shown in the various Figures having similar function, and repeated description of these elements is omitted.

FIG. 1a shows a representation of a periphery 100 of a display device 102 of a vehicle for displaying two images, having a device 104 for reducing a mutual influence of pixels of a pixel group of display device 102 according to an exemplary embodiment of the present invention. Periphery 100 is made up of a control device 106 and a microcontroller 108. The display device has a display 110 and a background lighting 112 of the display 110. Device 104 is realized as a component of control device 106. Control device 106 can be realized as an FPGA or integrated circuit. In this exemplary embodiment, control device 106 further has a second device for crosstalk correction 114, a device for timing control 116, and a register 118. The control device receives picture data 120, containing two images that are to be displayed. In device 104, color values of pixels contained in picture data 120 are corrected. The RGB color values are used for improved color reproduction and lower mutual influence of the images. Microcontroller 108 receives a brightness value from a light sensor 122 in the vehicle. In addition, microcontroller 108 communicates with register 118 via a bus, for example an SPI bus, in order for example to store the brightness value there and/or to read out an item of brightness information of picture data 120. Based on these values, microcontroller 108 influences a brightness of the background lighting 112, for example using a pulse-width-modulated signal PWM. Control device 106 manipulates picture data 120 and passes the picture data to display 110.

In other words, FIG. 1a shows a system 100 for DualView via a central display 102 in the motor vehicle. The system has a video input, an FPGA 100 for correcting the picture data using a device 104 as presented here for reducing the mutual influence, a crosstalk correction 114 and a timing controller 116, a microcontroller 108 for system controlling, a light sensor 122, and a display 110 having a (LED) background lighting 112.

Microcontroller 108 has the possibility of transmitting, via an interface (typically SPI), data to FPGA 100, into a register 118 present there, in order to parametrize the characteristic of logic blocks 104, 114, 116. Microcontroller 108 controls the brightness of display 102 by outputting a PWM signal as a function of the desired display brightness. This PWM controlling can alternatively also take place via FPGA 100, or can be integrated as a digital value into an integrated LED driver module.

Figure 1B:
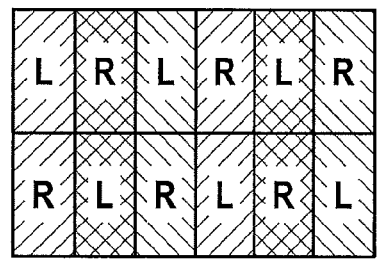
FIG. 1b shows a configuration of subpixels of the display device for displaying two images.

FIG. 1b shows a representation of a configuration of subpixels of display device 102 for displaying two images. The subpixels are realized in the basic colors for additive color mixing, red, green, and blue, and are situated one over the other in rows of identical colors. The three colors are situated next to one another in lines, and continuously repeat. FIG. 1b shows two successive repetitions. One each of the subpixels of the same color situated one over the other is allocated to one of the two images L and R (left and right image). In the subsequent color, the subpixels of images L and R are reversed. In order to enable recognition of images L and R from a separate angle of view in each case, a mask is situated in front of the subpixels. The mask is not shown. From a first angle of view from the right, the mask blocks the subpixels of the left image. From an angle of view from the left, the mask blocks the subpixels of right image R. The mask has openings configured in the manner of a chessboard. A pixel of an individual image L or R has in each case a subpixel in one line, and each has two subpixels in the other line. An orientation of the adjacent pixels of an image is in each case opposite.

The crosstalk between the driver and passenger image in DualView displays as in FIG. 1b is proportional to the contrast, and can therefore be reduced through digital reduction of the white brightness, and can be referred to as white dimming. Instead of maximum white brightness (digital 255/255/255), a lower digital value, for example (225/225/225), is outputted as white. The white dimming differs from a digital white balance in that the R/G/B values are always modified in the same ratio in order not to change the white balance. Due to the reduced brightness, in daylight display device 102 may be more difficult to read. Therefore, it is advantageous to carry out the reduction of the white brightness as a function of the ambient brightness, and in particular to use it only under conditions of darkness. The higher crosstalk during daylight and/or higher ambient brightness is mostly not perceivable.

The further crosstalk reduction 114 can take place via a black value increase and digital crosstalk compensation. This can take place independently of the modification of the white brightness for the further reduction of crosstalk.

Light sensor 122 can be contained in a different control device. The value of the ambient brightness can be transmitted digitally (e.g., via CAN) to the display. Additional quantities besides the brightness may enter into the dimming (e.g., a value of a rotary knob, temperature, compensation values, boundary values, etc.). The regulation of the white brightness can be integrated into the white balance block. The light dimming can take place in identical fashion for the driver image and the passenger image, which is especially advantageous in the case of symmetrical DualView displays. The asymmetry correction can be stored as a fixed, non-adjustable correction value in the FPGA. The asymmetry correction can take place in the microcontroller, so that two identical functional blocks having two different dimming parameters can be used for the white dimming on the left and right side in the FPGA.

Figure 2:
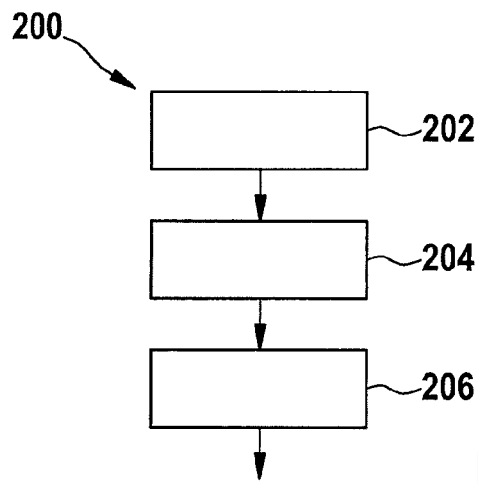
FIG. 2 shows a flow diagram of a method for reducing a mutual influence of pixels of a pixel group according to an exemplary embodiment of the present invention.

FIG. 2 shows a flow diagram of a method 200 for reducing a mutual influence of pixels of a pixel group according to an exemplary embodiment of the present invention. The method has a step of receiving 202, a step of adapting 204, and a step of provision 206. The pixel group has at least one first pixel allocated to a first image and at least one second pixel adjacent thereto allocated to a second image. The first image is represented so as to be recognizable from a first direction of view on a viewing direction-dependent display device. The second image is represented so as to be recognizable from a second direction of view, differing from the first direction of view, on the display device. In the step of reception 202, an item of picture information of the first image and an item of picture information of the second image are received. The at least one first pixel and the at least one second pixel each have the same pixel coordinate in the images. The pixel coordinate can lie within a tolerance range. In the step of adaptation 204, a first brightness factor of the at least one first pixel and a second brightness factor of the at least one second pixel are adapted using a processing rule in order to reduce the mutual influence. Here, in particular the overall brightness of the brighter image is reduced by the associated brightness factor in order not to outshine the darker image. In the step of provision 206, the adapted items of picture information of the first and second image are provided for further processing by further methods, or are provided directly to the display.

Figure 3:
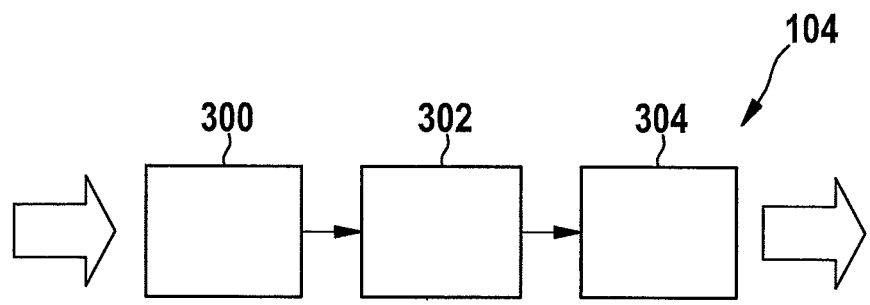
FIG. 3 shows a detail of a block diagram of a device for reducing a mutual influence of pixels of a pixel group according to an exemplary embodiment of the present invention.

FIG. 3 shows a detail of a block schematic diagram of a device for reducing a mutual influence of pixels of a pixel group according to an exemplary embodiment of the present invention. In the detail, device 104 for reducing a mutual influence of pixels of a pixel group from FIG. 1 is shown in more detail. Device 104, as RGB correction block in the FPGA, has a device for white balance 300, a device for gamma correction 302, and a device for regulating a white brightness 304. Device 300 for white balance receives picture data, in particular moving picture data from a video input of the control device shown in FIG. 1. In device 300 for white balance, red, green, and blue color values of the image data are modified corresponding to a desired color appearance of white. For this purpose, the color channels are individually amplified or attenuated with a corresponding factor. The white balance is used for the digital correction of the white color location. In the device for gamma correction, the color channels are amplified or attenuated in non-linear fashion corresponding to an incorrect perception on the part of a viewer of the display device. Here it is taken into account that the human eye is more sensitive to changes in dark image regions than in bright image regions. For this purpose, the digital gamma correction corrects the gamma curves of primary colors red, green, and blue to the target value, using a lookup table. Following this, the image data are supplied to the further crosstalk correction and the timing controller, as shown in FIG. 1a.

Figure 4:
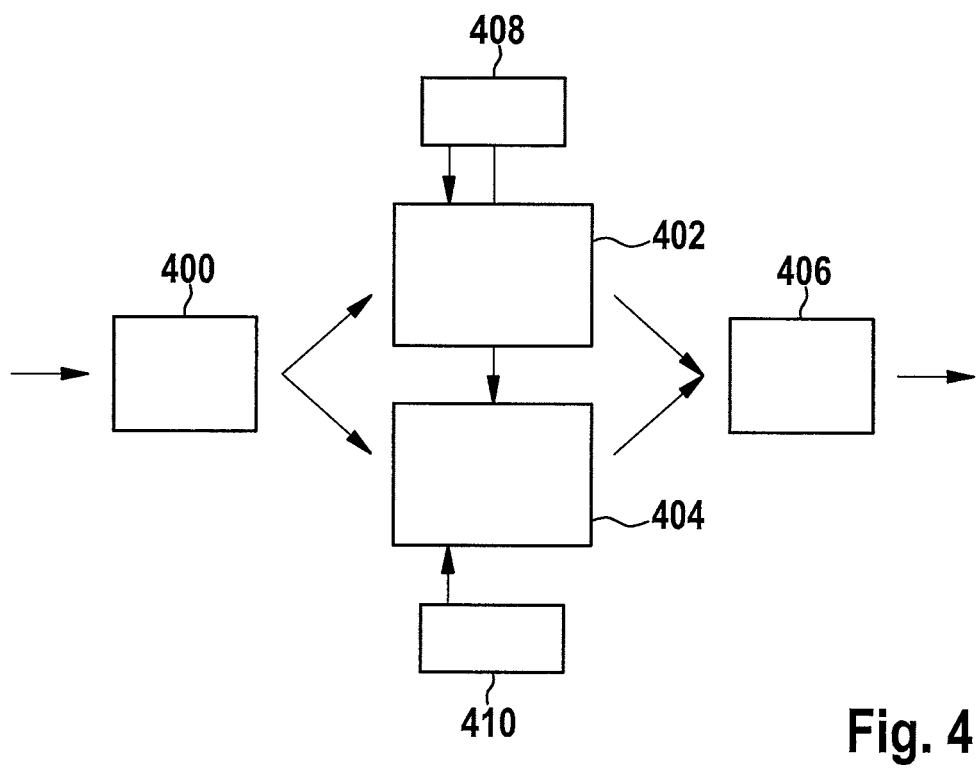
FIG. 4 shows a representation of a data flow during a method for reducing a mutual influence of pixels of a pixel group according to an exemplary embodiment of the present invention.

FIG. 4 shows a representation of a data flow during a method for reducing a mutual influence of pixels of a pixel group according to an exemplary embodiment of the present engine. Shown are a pixel selector 400, a white dimming left 402, a white dimming right 404, and a pixel assembler 406. Pixel selector 400 receives an RGB data stream. A left image and a right image are interleaved in the RGB data stream. Pixel selector 400 separates the left image from the right image. The interleaved RGB data stream corresponds to a case typical for DualView in that the images for the driver and passenger are "interleaved" at the subpixel level. The pixels for the driver (left) and passenger (right) are therefore selected out by pixel selector 400.

In the white dimming left 402, the left image is dimmed via a left brightness factor. In the white dimming right 404, the right image is dimmed via a right brightness factor. The left brightness factor and the right brightness factor are read out from a register as in FIG. 1 as parameters for dimming 408. The color values for the driver of the vehicle are corrected as a function of a parameter "dimming X" 408 that can be adjusted via the register.

$$R_{out,left} = R_{in,left} \cdot \frac{X}{255}$$

A correction of the color channels of G and B takes place correspondingly. In this exemplary embodiment, in the white dimming right 404, an asymmetry parameter 410 is additionally taken into account that represents an asymmetrical situation of the display in the vehicle and the optical changes connected therewith. The correction of the color values for the passenger takes place reduced by asymmetry parameter Y 410.

$$R_{out,right} = R_{in,right} \cdot \frac{X \cdot \frac{Y}{255}}{255}$$

The division by 255 can be efficiently implemented in an FPGA as in FIG. 1 by a shift register. Given a color depth differing from 8 bits, the divisor changes corresponding to the number of possible color levels. Parameters X and Y 408, 410 are located in registers, and can be set by the microcontroller. Asymmetry parameter 410 can alternatively also be set fixedly in the FPGA. In this way, the white dimming is carried out differently for the image of the driver and of the passenger in order to simultaneously compensate, in the case of darkness, the differing brightness of the two images caused by the asymmetry of the display. This can be omitted in the case of symmetrical DualView displays. After the white dimming left 402 and white dimming right 404, the left image and the right image are again assembled in pixel assembler 406 to form the interleaved RGB data stream.

Figure 5A:
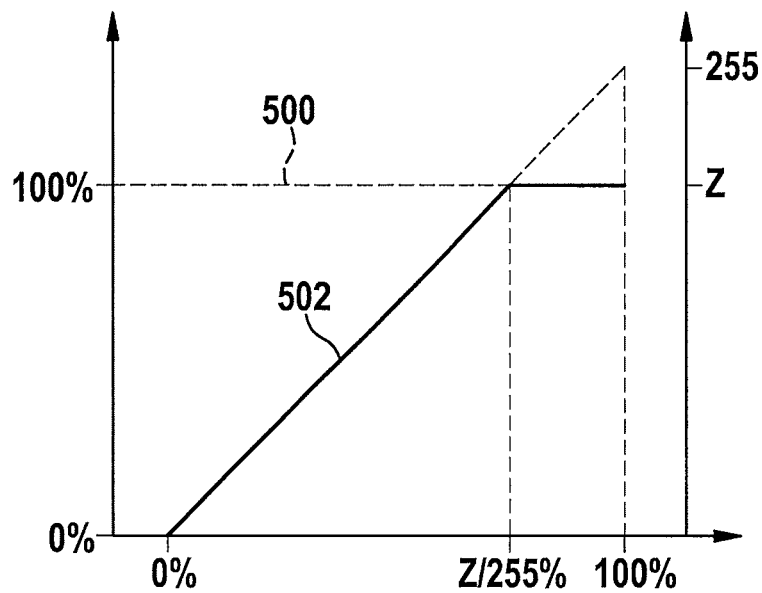
FIGS. 5a and 5b show diagrams of a brightness curve according to a method for reducing a mutual influence of pixels of a pixel group according to a respective exemplary embodiment of the present invention.
Figure 5B:
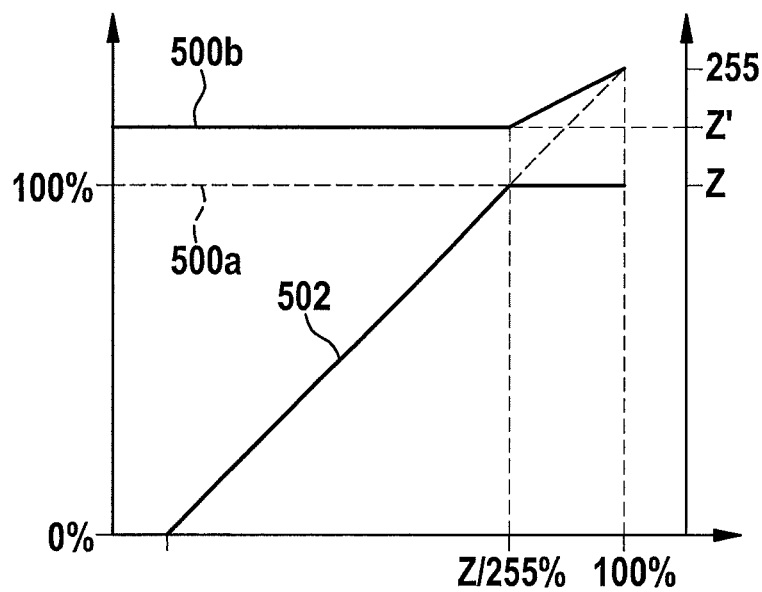

FIGS. 5a and 5b show diagrams of a brightness curve according to a method for reducing a mutual influence of pixels of a pixel group according to an exemplary embodiment of the present invention. A target brightness between zero and 100% is plotted on the abscissa. The ordinate has two scales. A first scale shows a pulse-duty factor of a pulse-width modulation of between zero and 100% for the background lighting. A second scale shows a white brightness for eight bits having 255 brightness levels. A curve 500 shows the curve of the white brightness. A curve 502 shows the curve of the background lighting.

FIG. 5a shows how an adjustment of the target brightness takes place according to an exemplary embodiment of the present invention with white brightness and background lighting given a symmetrical installation of a display in a vehicle. At maximum brightness, at 100% target brightness the background lighting operates with 100% pulse-duty factor and the white brightness has the maximum value of 255. Up to a defined value Z, the background lighting stays at 100% pulse-duty factor, while the white brightness is reduced according to the target brightness specification. Beginning from the value Z, the white brightness remains constant and the pulse-duty factor of the background lighting is reduced corresponding to the target brightness specification. At 0% target brightness, the pulse-duty factor is zero and the white brightness has the value Z.

FIG. 5b shows how an adjustment of the target brightness takes place according to an exemplary embodiment of the present invention with white brightness and background lighting for the case of an asymmetrical installation of a display in a vehicle. FIG. 5b shows a curve 500a of the white brightness of the driver image and a curve 500b of the white brightness of the passenger image. Given maximum brightness, at 100% target brightness the background lighting operates with 100% pulse-duty factor and the white brightness of driver image 500a and of passenger image 500b have the maximum value of 255. Up to a defined value Z, the background lighting remains at 100% pulse-duty factor, while the white brightness of driver image 500a is reduced according to the target brightness specification. Up to a defined value Z', the background lighting remains at 100% pulse-duty factor while the white brightness of passenger image 500b is reduced according to the target brightness specification. Starting from the values Z and Z', the white brightnesses of driver image 500a and passenger image 500b remain constant, and the pulse-duty factor of the background lighting is reduced corresponding to the target brightness specification. At 0% target brightness, the pulse-duty factor is zero and the white brightnesses have the values Z and Z'. In this exemplary embodiment, the value Z' is greater than the value Z.

In addition, according to a specific embodiment the method can also be used to match the originally (i.e., at a white brightness of 255 in each case) different white brightness of the driver and passenger images—at least for brightness values<Z/255%, i.e., the bend in the characteristic curve.

For example, an original brightness on the passenger side can be regarded as a reference (Ref) of 100%, and an original brightness at the driver side is then set to 120%*Ref. The white controlling on the driver side can then be reduced to 75%, so that a brightness of 75%*120%=90% results. For the white controlling on the passenger side, a value then results of 90%, i.e., this value corresponds to the brightness as on the driver side.

The controlling of the dimming can take place via the microcontroller as shown in FIG. 1. This microcontroller takes over the division of the brightness reduction into a portion via the white dimming and a portion via reduction of the PWM pulse-duty factor of the background lighting (conventional dimming). This can for example take place corresponding to the characteristic curves shown in FIG. 5.

In the characteristic curves, parameter Z here defines the changeover point between white dimming 500 and PWM dimming 502. As a function of the target brightness, from the characteristic curve there results the PWM value to be set and dimming parameter X, which is then transmitted to the FPGA.

Other characteristic curve shapes are also possible, for example an earlier setting of the PWM dimming simultaneous with the white dimming, or non-linear characteristic curves.

The exemplary embodiments described and shown in the Figures are selected only as examples. Different exemplary embodiments may be combined with one another in their entirety or with regard to individual features. An exemplary embodiment may also be supplemented with features of another exemplary embodiment.

In addition, method steps according to the present invention may be repeated, or executed in a sequence differing from that described.

If an exemplary embodiment has an "and/or" linkage between a first feature and a second feature, this is to be read as meaning that the exemplary embodiment according to one specific embodiment has both the first feature and the second feature, and according to another specific embodiment has either only the first feature or only the second feature.

What is claimed is:

1. A method for reducing a mutual influence of interleaved pixels, the method comprising:
receiving, by processing circuitry, image data that includes pixels of a first image and pixels of a second image, wherein coordinates of the pixels of the first image and coordinates of the pixels of the second image are interleaved;

modifying, by the processing circuitry, values of the pixels of the received image data such that, for a first one of the pixels of the first image and a first one of the pixels of the second image that are interleaved at approximately a same coordinate, a first brightness factor is applied to the first one of the pixels of the first image and a second brightness factor is applied to the first one of the pixels of the second image according to a condition that there be a greater reduction in brightness to whichever of (i) the first one of the pixels of the first image and (ii) the first one of the pixels of the second image is brighter; and outputting, by the processing circuitry, the modified pixels for display in a display area of a display device so that the first image is viewable when the display area is observed from a first direction and the second image is viewable when the display area is observed from a second direction.

2. The method as recited in claim 1, wherein the modifications are performed using an ambient brightness value.

3. The method according to claim 1, wherein the modifications include at least one of adapting the first brightness factor using a first ambient brightness value, and adapting the second brightness factor using a second ambient brightness value.

4. The method as recited in claim 1, wherein the modifications include at least one of: i) adapting the first brightness factor using a radiation characteristic of the display device that is a function of the direction of view, and ii) adapting the second brightness factor using the radiation characteristic.

5. The method as recited in claim 1, wherein the modifications include at least one of: i) adapting the first brightness factor using a first correction parameter that can be inputted by a first viewer of the first image, and ii) adapting the second brightness factor using a second correction parameter that can be inputted by a second viewer of the second image.

6. The method as recited in claim 1, wherein the modifications include at least one of: i) adapting the first brightness factor using a first color correction value, and ii) adapting the second brightness factor using a second color correction value.

7. The method as recited in claim 1, further comprising:
influencing a background brightness of the display device using a further processing rule.

8. The method as recited in claim 7, further comprising selecting a target brightness level, wherein the influencing of the background brightness is performed conditional upon that the selected target brightness level is below a threshold.

9. The method as recited in claim 1, further comprising selecting a target brightness level and selecting a maximum white brightness value based on the selected target brightness level by performing an algorithm, wherein the first and second brightness factors are based on the selected maximum white brightness value that provides that:

in a first range between a highest target brightness level down to a threshold target brightness level, (a) the lower the selected target brightness level, the lower the selected maximum white brightness value down to a predetermined white brightness value and (b) background brightness is the same for all of the target brightness levels of the first range; and in a second range between a lowest target brightness level up to the threshold target brightness level, (a) the lower the selected target brightness level, the greater is a reduction to the background brightness and (b) the maximum white brightness value is set to the predetermined white brightness value for all of the target brightness levels of the second range.

10. The method as recited in claim 1, wherein the modifications are performed conditional upon that a sensed ambient brightness value is below a preset threshold.

11. A device for reducing a mutual influence of interleaved pixels, the device comprising:
processing circuitry; and
an interface via which the processing circuitry is configured to receive image data that includes pixels of a first image and pixels of a second image and to provide an output to a display device;
wherein:
coordinates of the pixels of the first image and coordinates of the pixels of the second image are interleaved; and
the processing circuitry is configured to:
modify values of the pixels of the received image data such that, for a first one of the pixels of the first image and a first one of the pixels of the second image that are interleaved at approximately a same coordinate, a first brightness factor is applied to the first one of the pixels of the first image and a second brightness factor is applied to the first one of the pixels of the second image according to a condition that there be a greater reduction in brightness to whichever of (i) the first one of the pixels of the first image and (ii) the first one of the pixels of the second image is brighter; and
provide the modified pixels as the output for display in a display area of the display device so that the first image is viewable when the display area is observed from a first direction and the second image is viewable when the display area is observed from a second direction.

12. A computer readable storage device storing program code that is executable by a processor and that, when executed by the processor, causes the processor to perform a method for reducing a mutual influence of interleaved pixels, the method comprising:

receiving image data that includes pixels of a first image and pixels of a second image, wherein coordinates of the pixels of the first image and coordinates of the pixels of the second image are interleaved;

modifying values of the pixels of the received image data such that, for a first one of the pixels of the first image and a first one of the pixels of the second image that are interleaved at approximately a same coordinate, a first brightness factor is applied to the first one of the pixels of the first image and a second brightness factor is applied to the first one of the pixels of the second image according to a condition that there be a greater reduction in brightness to whichever of (i) the first one of the pixels of the first image and (ii) the first one of the pixels of the second image is brighter; and outputting, by the processing circuitry, the modified pixels for display in a display area of a display device so that the first image is viewable when the display area is observed from a first direction and the second image is viewable when the display area is observed from a second direction.

* * * * *